July 21, 1953 N. BEDINI 2,646,245
HIGH-PRESSURE FLUID CONTROL VALVE
Filed Dec. 8, 1947
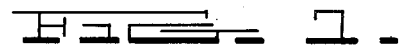
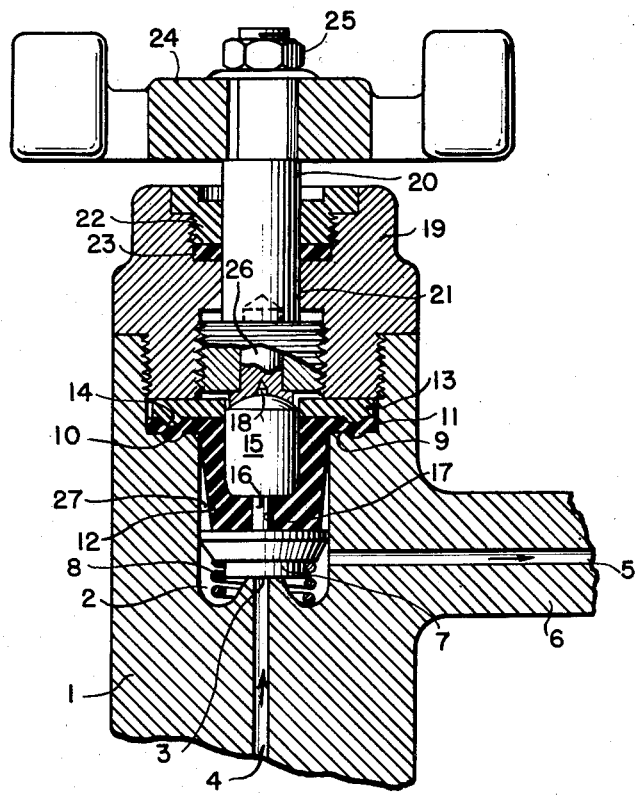
INVENTOR.
Nerino Bedini
BY
Attorneys.

UNITED STATES PATENT OFFICE 2,646,245

HIGH-PRESSURE FLUID CONTROL VALVE

Nerino Bedini, Milan, Italy, assignor to Pirelli Societa per Azioni, Milan, Italy Application December 8, 1947, Serial No. 790,284
In Italy October 18, 1945

Section 1, Public Law 690, August 8, 1946
Patent expires October 18, 1965

9 Claims. (Cl. 251—31)

This invention relates to high pressure fluid control valves. It pertains more particularly to valves of this kind wherein a flexible diaphragm is employed to seal the extraneous outlets from the valve chamber, particularly around the movable elements of the valve, to insure against the leakage of fluid under high pressure through the valve.

Heretofore, in valves of this type two difficulties have commonly been encountered. First, the deformations of the flexible member incident to the movements of the movable elements of the valve have tended to cause permanent deformation of the flexible member, and secondly, repeated flexings of the diaphragm member with the movements of the movable elements of the valve have caused a shearing through of said flexible diaphragm along its seating line. Both of these difficulties result in leakage of fluid through the valve.

An object of this invention is to devise a high pressure fluid control valve of the flexible diaphragm type wherein the said diaphragm is of such novel shape and construction as to prevent permanent deformation from repeated operation of the valve.

Another object of this invention is to devise a high pressure fluid control valve of the diaphragm type wherein means are provided to prevent shearing failure of the diaphragm from repeated opening and closing of the valve.

Still another object of this invention is to provide a high pressure fluid control valve of simple, compact and rugged construction which can be readily assembled and disassembled and which will have a much longer useful life than valves of this type heretofore available.

With these and other objects in view which may be incident to this improvement, this invention consists of the combination and arrangement of elements hereinafter described and illustrated in the accompanying drawing which shows the preferred embodiment of the improved valve in central longitudinal section.

Referring to the drawing, it will be seen that the valve shown comprises a body member 1 having a central, cylindrical valve chamber 2 communicating near its lower end through an inlet orifice 3 with an inflow passage 4 for the admission of fluid under high pressure to the valve. The chamber 2 is also in communication with an outlet passageway 5 in a branch 6 extending from the side of body 1, for the discharge of fluid from the valve.

The inlet orifice 3 is controlled by a disc-shaped valve head 7 which is adapted to reciprocate vertically in the valve chamber 2 and has interposed between its lower face and the bottom of said chamber a coiled compression spring 8. This spring 8 is always under compression and moves the valve head 7 away from the orifice 3 whenever the actuating mechanism of the valve is moved to open the valve.

The upper end of the valve chamber 2 is enlarged in diameter to form a shoulder 9, provided with an annular groove 10, on which is seated an annular flange 11 of an elastically flexible diaphragm member 12 which is centrally disposed in the valve chamber 2 above and in abutting contact with valve head 7.

The annular portion 11 of the diaphragm 12 is firmly clamped against its seat on the shoulder 9 by an annular disc member 13 whose width is equal to the full width of the upper face of the flange portion 11. The disc 13 is formed on its underside with an annular rib 14 which registers with the annular groove 10 so that when the flange 11 is clamped to its seat by the disc 13, the rubber (or other flexible material) of the flange is forced into the groove 10, thus insuring a perfect grip of the flange 11 on its seat and a fluid-tight seal between the contacting parts.

Extending into and completely filling the cup-shaped portion of the diaphragm 12 is a cylindrical plug 15 having a stem 16 depending from its bottom face and extending through a central hole 17 in the base portion of the diaphragm 12 and of a diameter equal to that of the hole. The upper face of the plug 15 has a spherically crowned shape and is surmounted at its center by an upwardly projecting centering lug 18.

The upper enlarged portion of the valve chamber 2 is internally threaded for the reception of the external threads of a bonnet member 19 which, when screwed home, holds the disc 13 firmly against the flange 11, as clearly shown in the drawing.

The bonnet 19 is internally threaded near its lower end for the reception of the external threads of a valve stem 20 which extends vertically up through a hole 21 in the mid-portion of the bonnet 19 and is held in fluid tight contact with the upper portion of said bonnet by a conventional gland nut 22 and packing 23.

Surmounting the squared upper end of the valve stem 20 is a detachable hand wheel 24 held in locked relation with the stem 20 by the lock nut 25. The lower end of the stem 20 is centrally recessed to receive the stem of a cylindrical thrust bearing member 26 whose lower face is of concave shape to exactly fit the convex upper face of the plug 15 and is centered on said plug in axial alignment by the registration of the centering lug 18 with a recess in the center of the lower face of the member 26.

When the valve stem 20 is rotated by manual operation of the hand wheel 24, the thrust bearing 26, being slidingly fitted into the recess in said stem 20, does not turn with said stem, anyhow, if it rotates the upper face of the plug 15 is held against rotation by the firm grip of the flexible diaphragm 12. Consequently there is no tendency for torque to be transmitted to the plug 15 and the diaphragm 12 from the valve stem 20.

The axial length of the hole 17 is slightly greater than that of the stem 16 of the plug 15, and thus when the valve is closed the bottom portion of the diaphragm 12 is compressed between the bottom of the plug 15 and the top of the valve head 7, until the stem 16 contacts the upper face of the valve head 7. When the stem 16 contacts the valve head 7, the downward thrust of the valve stem 20 is transmitted through the bearing 26, the plug 15 and the stem 16 direct to the valve head 7, although the compression strain in the lower part of the flexible diaphragm 12 also transmits some of the thrust from the plug 15 to the valve head 7. When the valve is in fully closed position the lower end of the stem 16 is forced hard against the upper face of the valve head 7 so as to press said head firmly down onto its seat around the orifice 3. At the same time, the base of the cup shaped portion of the diaphragm 12 is in a state of deformed compression between the plug 15 and the valve head 7 with resultant forcing of the wall of the hole 17 into fluid tight sealing contact with the periphery of the stem 16. The external surface of the cup shaped portion of the diaphragm 12 is slightly conical, as clearly shown in the drawing, so as to leave between it and the wall of the valve chamber 2 an annular clearance space 27.

The dimensions of the various parts and the elastic compressibility of the diaphragm are such that when the valve is closed, the side wall of the cup shaped portion of the diaphragm 12 is neither in tension nor compression, and when the valve is open, the pressure of the fluid now occupying the valve chamber 2 and the space 27 combined with the upward thrust of the spring 8 is sufficient to compress the cup shaped portion of the flexible diaphragm 12 into intimate contact with the wall of the chamber and also, by reason of the reaction of that wall, into increased sealing contact with the periphery of the stem 16 of the plug 15.

The particular construction described and shown in the drawing lends itself to easy and speedy assembly and dismantling of the valve while the side walls of cup shaped portion of the flexible diaphragm 12, being free of tensile or compressive stress when the valve is closed (its generally prevailing position), the said diaphragm has a greatly increased useful life period before it has to be renewed. Also the reinforcement of the flange portion 11 of the diaphragm 12 by the clamp disk 13 prevents the shearing of the flange 11 from the cup shaped portion of the diaphragm 12 from repeated application of pressure on said diaphragm.

While I have shown and described the preferred embodiment of my invention, I desire it to be understood that I do not limit myself to the precise details of construction shown by way of illustration, as these may be changed and modified in combination and arrangement by those skilled in the art without departing from the spirit of my invention or exceeding the scope of the appended claims.

I claim:

1. A high pressure fluid control valve comprising a valve chamber having a shoulder and a fluid inlet and a fluid outlet, a valve head for controlling the fluid flow through said outlet, a cup shaped expansible diaphragm in said chamber separate from said valve head and adapted to seal said chamber against fluid leakage, said diaphragm having an outwardly extending flange seating on said shoulder and clamped in fluid tight contact therewith by a rigid overlying disc which covers the entire top surface of said flange and prevents shearing of said diaphragm in the plane of said flange.

2. A high pressure fluid control valve comprising a valve body, a valve chamber within said body having a fluid inlet orifice and a fluid outlet orifice, a rigid valve head slidably mounted in said chamber and adapted to seat directly on said inlet orifice, means movable separately from said valve head for applying a thrust to said valve head lengthwise of its direction of slide, and an expansion diaphragm mounted within said chamber and having a portion fixed with respect to said valve body and said diaphragm encircling said means and adapted to be expanded thereby transversely of the movement of said means, whereby the space between said means and said diaphragm is sealed and leakage of fluid from said chamber around said means is prevented at such times when said inlet orifice is opened.

3. A high pressure control valve comprising a valve body, a valve chamber in said body and having a fluid inlet orifice and a fluid outlet orifice, a valve head in said chamber adapted to seat on said inlet orifice, means within said chamber separately movable from said valve head for controlling the position of said valve head with respect to said inlet orifice, and an expansible diaphragm mounted in said chamber and having a portion fixed with respect to said valve body and said diaphragm being interposed between said valve head and said actuating means and having a recess extending inwardly from one face and within which recess said actuating means is seated and is encircled by the walls of said recess, said actuating means being embraced with increasing pressure by said diaphragm when the former moves toward said valve head.

4. A valve according to claim 3 wherein said chamber is provided with a shoulder and said diaphragm has an outwardly extending flange seating on said shoulder and clamped in fluid tight contact therewith by a rigid annular disc overlying said flange.

5. A valve according to claim 3 wherein the side wall of the recessed portion of said diaphragm is without stress when said valve head is in closed position.

6. A high pressure fluid control valve comprising in combination: a body, a valve chamber in said body, having a fluid inlet and a fluid outlet orifice, a rigid valve head reciprocally mounted in said chamber and adapted to seat directly upon and close one of said orifices when said valve head is in closed position; a valve stem threadedly mounted in said body; a movable, rigid thrust member, separably interposed between said valve stem and said valve head, and adapted to transmit axial thrust directly from the said stem to said head upon rotation of the former; and a cup-shaped, radially-expansible diaphragm, non-rotatably mounted in said valve chamber between said thrust member and the sidewall of said chamber, and adapted to be axially compressed between a portion of said thrust member and said valve head and also radially expanded, by the movement of said thrust member and the fluid pressure in said valve chamber, so as to increase the fluid sealing pressure of said diaphragm against said thrust member and valve head, whereby fluid leakage from said valve chamber is prevented.

7. A control valve according to claim 6, wherein said axial thrust member comprises a cylindrical plug wholly embraced within said diaphragm; said plug being adapted to compress a portion of said diaphragm between said plug and said valve head, when said valve head is moved towards its closed position.

8. A control valve according to claim 6, wherein said thrust member is prevented from rotating upon rotation of said valve stem by the frictional contact between said thrust member and said diaphragm.

9. A high pressure fluid control valve comprising a valve chamber having a fluid inlet and a fluid outlet, a valve head, for controlling the flow through said fluid inlet, and a separate thrust-transmitting member in said chamber; rotatable means, extending into said chamber and separate from said valve head and thrust-transmitting member, for applying an axial thrust through said thrust-transmitting member to said valve head to move said valve head toward closed position; means for biasing said head toward open position; a radially expansible diaphragm wholly embracing said thrust-transmitting member with a fluid-tight contact, and means for increasing the pressure of said contact as said valve head is moved toward open position.

NERINO BEDINI.

References Cited in the file of this patent

UNITED STATES PATENTS

| Number | Name | Date |
|---|---|---|
| 113,503 | Dinnen | Apr. 11, 1871 |
| 174,551 | McKenzie | Mar. 7, 1876 |
| 517,550 | Messinger | Apr. 3, 1894 |
| 957,347 | Kennedy | May 10, 1910 |
| 978,288 | Harkom | Dec. 13, 1910 |
| 1,485,792 | McKay | Mar. 4, 1924 |
| 1,495,761 | Moussette | May 17, 1924 |
| 1,853,156 | Sobon | Apr. 12, 1932 |
| 2,089,977 | Marchant | Aug. 17, 1937 |
| 2,277,395 | Franck | Mar. 24, 1942 |

FOREIGN PATENTS

| Number | Country | Date |
|---|---|---|
| 176,421 | Switzerland | of 1935 |